(12) United States Patent
Batariere et al.

(10) Patent No.: US 7,145,862 B2
(45) Date of Patent: Dec. 5, 2006

(54) METHOD AND APPARATUS FOR TRANSMISSION AND RECEPTION OF DATA

(75) Inventors: Mickael D. Batariere, Schaumburg, IL (US); Brian K. Classon, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 687 days.

(21) Appl. No.: 10/408,944

(22) Filed: Apr. 8, 2003

(65) Prior Publication Data

US 2004/0202142 A1    Oct. 14, 2004

(51) Int. Cl.
    *H04J 11/00*    (2006.01)
(52) U.S. Cl. ............... 370/203; 370/204; 370/206; 370/208; 370/343; 375/298
(58) Field of Classification Search ............... 370/535, 370/537, 465, 204, 205, 206, 207, 208, 209, 370/213, 214; 375/242, 222, 223, 225, 261, 375/298, 343
See application file for complete search history.

(56) References Cited

U.S. PATENT DOCUMENTS

| | | | | |
|---|---|---|---|---|
| 5,530,920 A | * | 6/1996 | Takeda | 455/102 |
| 5,533,004 A |   | 7/1996 | Jasper et al. | |
| 5,537,410 A | * | 7/1996 | Li | 370/465 |
| 5,771,226 A | * | 6/1998 | Kaku | 370/232 |
| 5,784,683 A | * | 7/1998 | Sistanizadeh et al. | 725/73 |
| 6,192,070 B1 | * | 2/2001 | Poon et al. | 375/222 |
| 6,356,555 B1 | * | 3/2002 | Rakib et al. | 370/441 |
| 2002/0150037 A1 |   | 10/2002 | Bao et al. | |
| 2002/0167923 A1 |   | 11/2002 | Sendonaris et al. | |

FOREIGN PATENT DOCUMENTS

EP    1 154 602 A1    11/2001

OTHER PUBLICATIONS

"Iterative channel estimation and decoding for a turbo coded OFDM system via the EM algorithm", Zhuang, X.J.; Vook, F.W., Acoustics, Speech, and Signal Processing, 2002 IEEE International Conference.
"Pilot-symbol-aided channel estimation for OFDM in wireless systems", Ye Li, Vehicular Technology, IEEE Transactions, Jul. 2000.
"Linear two dimensional pilot assisted channel estimation for OFDM systems", Said, F.; Aghvami, H. Telecommunications, 1998. 6th IEEE Conference.

* cited by examiner

*Primary Examiner*—Ajit Patel
(74) *Attorney, Agent, or Firm*—Kenneth A. Haas; Jeffrey K. Jacobs (57) ABSTRACT

To address the need for reducing pilot overhead, a method and apparatus for transmitting and receiving data is provided herein. A communication system having a transmitter (100) that utilizes adaptive modulation and coding (AMC) and utilizes lower-order modulated (e.g., QPSK) data as a substitute for pilot symbols during transmission. Data intended for a user utilizing a lower order modulation can be reliably detected, and if properly processed, used as pilots for a user that is trying to receive a higher order modulation (e.g., 64-QAM). Because lower order modulated data is utilized for pilots, fewer overall pilots are used. This greatly reduces pilot overhead, increasing data throughput.

17 Claims, 11 Drawing Sheets

Percentage of error in estimating transmitted QPSK symbols that can be used as pilots, typical urban channel at 60 mph.

METHOD AND APPARATUS FOR TRANSMISSION AND RECEPTION OF DATA

FIELD OF THE INVENTION

The present invention relates generally to communication systems, and in particular, to a method and apparatus for transmission and reception of data within such communication systems.

BACKGROUND OF THE INVENTION

Pilot assisted modulation is commonly used for communication systems. In particular, a pilot per sub-channel is broadcast, providing channel estimation to aid in subsequent demodulation of a transmitted signal. Several pilot assisted modulation schemes are utilized by communication systems, and typically comprise broadcasting a known sequence at known time intervals. A receiver, knowing the sequence and time interval, utilizes this information in demodulating/decoding subsequent non-pilot broadcasts.

While the broadcasting of a known pilot sequence aids in coherent demodulation, a drawback exists in that in next-generation communication systems pilot overhead can reduce data throughput. For example, approximately 20–25% of an Orthogonal Frequency Division Multiplexing (OFDM) link (e.g., one pilot per four data baud, plus one trailing pilot baud) is spent on overhead for the pilots used for channel estimation and coherent demodulation. Therefore, a need exists for a method and apparatus for performing coherent demodulation that reduces the amount of pilot data broadcast to receiving units.

DETAILED DESCRIPTION OF THE DRAWINGS

To address the need for reducing pilot overhead, a method and apparatus for transmitting and receiving data is provided herein. In the preferred embodiment of the present invention a communication system utilizing adaptive modulation and coding (AMC), utilizes lower-order modulated (e.g., QPSK) data as a substitute for pilot symbols during transmission. Data intended for a user utilizing a lower order modulation can be reliably detected, and if properly processed, used as pilots for a user that is trying to receive a higher order modulation (e.g., 64-QAM). Because lower order modulated data is used to estimate the channel instead of pilots, fewer overall pilots are used. This greatly reduces pilot overhead, increasing data throughput.

The present invention encompasses a method for data transmission. The method comprises the steps of determining a modulation coding for a plurality of data streams, wherein each of the plurality of data streams utilizes one of several available modulation and coding schemes. The plurality of data streams are multiplexed onto a frame, wherein the order of multiplexing the plurality of data streams is based on a type of modulation utilized for transmission for the plurality of data streams.

The present invention additionally encompasses a method for data reception. The method comprises the steps of receiving a frame of data, utilizing a pilot transmission for providing channel estimation to aid in subsequent demodulation of a transmitted signal, and utilizing lower order modulated data to provide channel estimation to aid in subsequent demodulation of the transmitted signal.

The present invention additionally encompasses an apparatus comprising a plurality of modulators outputting a plurality of data streams, a switch coupled to the plurality of modulators, and a transmission format controller coupled to the switch. The transmission format controller instructs the switch to multiplex the plurality of data streams onto a frame, wherein the order of multiplexing the plurality of data streams is based on a type of modulation utilized for transmission for the plurality of data streams.

Finally, the present invention encompasses an apparatus comprising a pilot channel estimator for utilizing a pilot transmission for providing channel estimation to aid in subsequent demodulation of a transmitted signal, and a data channel estimator for utilizing lower order modulated data providing channel estimation to aid in subsequent demodulation of the transmitted signal.

Figure 1:
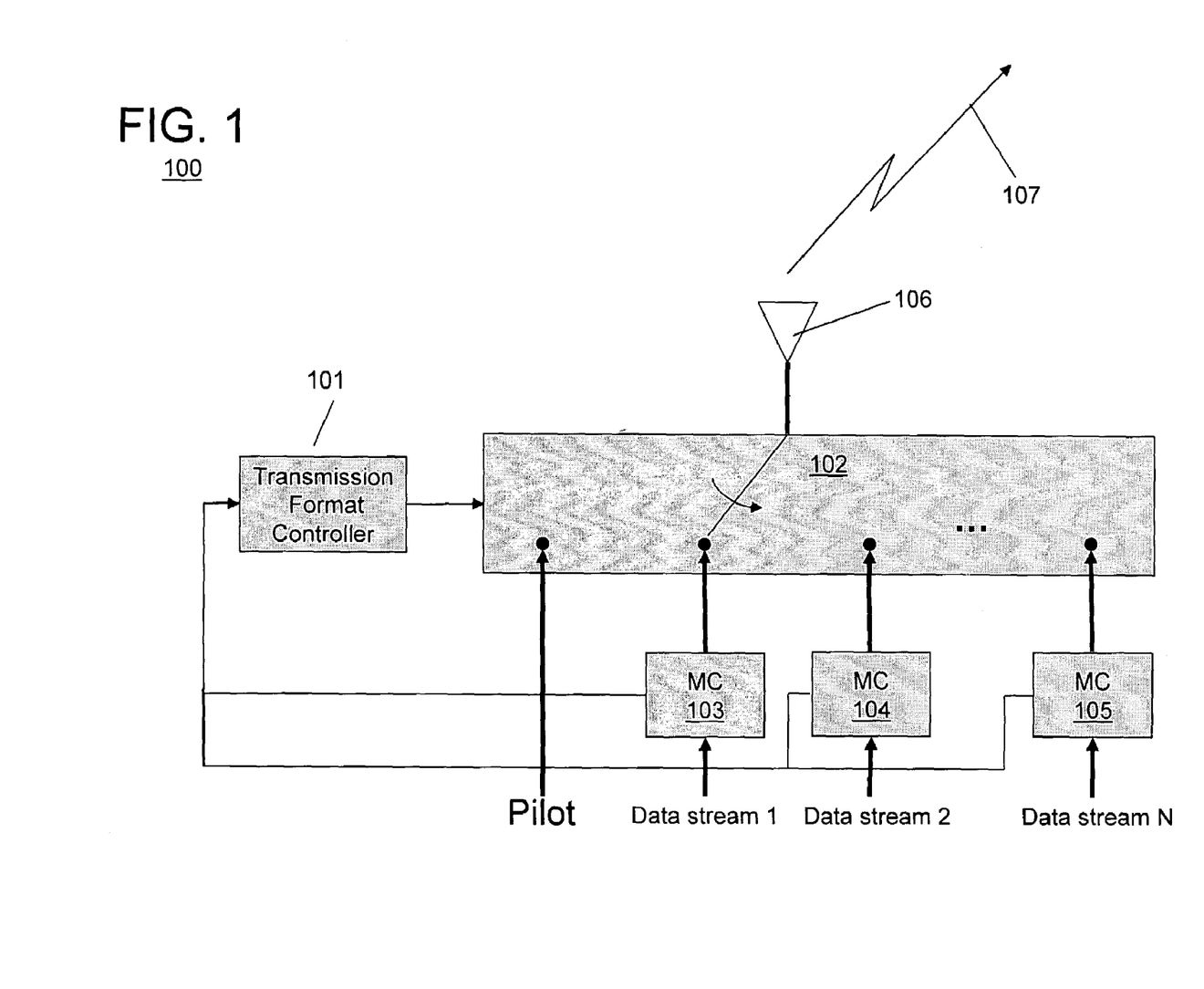
FIG. 1 is a block diagram of a transmitter utilizing a single carrier in accordance with the preferred embodiment of the present invention.

Turning now to the drawings, wherein like numerals designate like components, FIG. 1 is a block diagram of a transmitter in accordance with the preferred embodiment of the present invention. As shown, transmitter 100 comprises switch 102 controlled by transmission/frame format controller 101. In the preferred embodiment of the present invention transmitter 100 is preferably an OFDM transmitter utilizing Adaptive Modulation and Control (AMC). In alternate embodiments, transmitter 101 can be a single carrier, CDMA, or other kind of transmitter. For simplicity, FIG. 1 is shown with only one subcarrier (frequency) being transmitted from antenna 106.

With stream-level AMC, the modulation and coding format of a data stream is changed to match the current received signal quality (S/(I+N)). Once chosen, the modulation and coding scheme typically does not change for the stream. In a system with AMC along with multi-stream transmission, streams with high S/(I+N) are typically assigned higher order modulations rates (e.g., 64-QAM), with the modulation order and/or the code rate decreasing as S/(I+N) decreases. Thus, in the preferred embodiment of the present invention the multiple data streams (i.e., data streams 1, 2, . . . , N) enter respective modulation controllers 103–105. As discussed, each data stream is modulated utilizing a modulation scheme that is dependent upon a received signal quality for the stream. For those receivers experiencing high signal-to-noise, modulation schemes such as 16 QAM, 64 QAM or 256 QAM are utilized, while for those receivers experiencing low signal-to-noise, modulation schemes such as BPSK or QPSK are utilized.

As shown in FIG. 1, the output of each Modulation Coder (MC) 103–105 is input into switch 102. Additionally the modulation type utilized for the particular data stream is input into frame format controller 101. Frame format controller 101 controls switch 102 in order to appropriately order the time period for transmission of the data streams on over-the-air communication link 107. More particularly, frame format controller orders the transmission times for pilot data and data streams 1–N by placing lower order modulated data proximal to higher order modulated data, effectively substituting lower order modulated data for the pilot stream. As discussed above, receivers that have been assigned higher order modulated data within the communication system utilize lower order modulated (e.g., QPSK) data as a substitute for pilot symbols when coherently demodulating their data stream, greatly reducing pilot overhead. It is the relative order of the higher or lower order modulation that is important. A receiver that has been assigned a higher order modulation such as 1024 QAM could use 64 QAM data as a substitute for pilot symbols as well.

Figure 2:
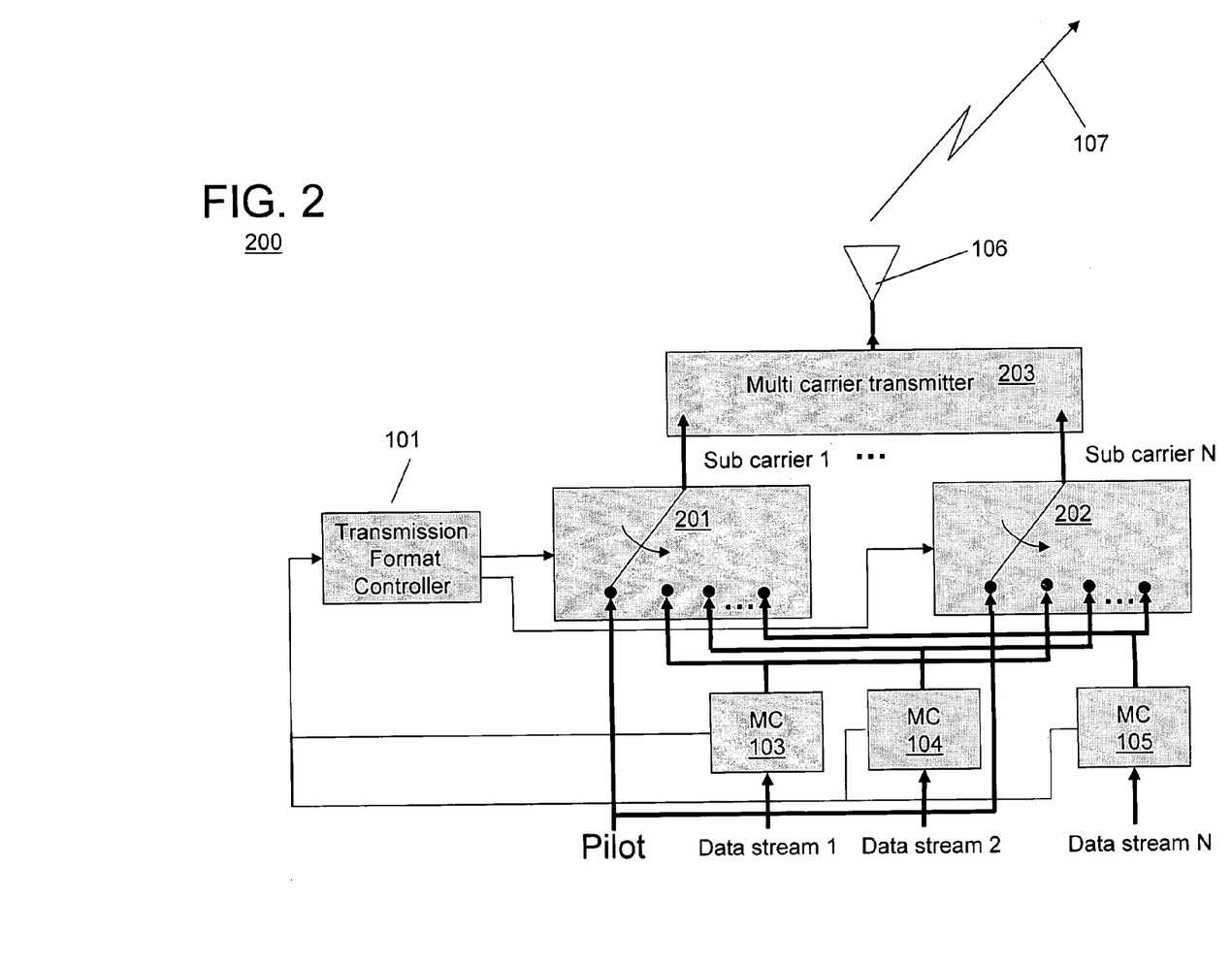
FIG. 2 is a block diagram of a transmitter utilizing multiple carriers in accordance with the preferred embodiment of the present invention.

For simplicity FIG. 1 illustrated data transmission utilizing a single carrier, however, one of ordinary skill in the art will recognize that in typical OFDM systems, multiple subcarriers are utilized to transmit data. This is illustrated in FIG. 2. In particular, FIG. 2 is a block diagram of a transmitter utilizing multi-carrier transmission in accordance with the preferred embodiment of the present invention. As is evident, multiple sub-carrier paths 201–202 are now shown. As one of ordinary skill in the art will recognize, an OFDM system divides available bandwidth into very many narrow frequency bands (subcarriers), with data being transmitted in parallel on the subcarriers. Transmitter of the multi-carrier communication system 203 combines all carriers for transmission over antenna 106. As is evident to one of ordinary skill in the art, in an OFDM multi-carrier communication system, the transmitter of the multi-carrier communication system 203 consists of an inverse fast Fourier transform. Both FIG. 1 and FIG. 2 are shown with only one antenna although the invention is fully compatible with multiple antenna transmit techniques such as Alamouti or MIMO multi-antenna transmission techniques. In the preferred embodiment of the present invention frame format controller 101 receives information from controllers 103–105 and adjusts each subcarrier so that lower order modulated data is placed proximal to higher order modulated data. Depending on the channel quality of the users with data to be scheduled, lower order modulated data may be distributed in an alternating manner with higher order modulated data between pilot data. This is illustrated with respect to FIG. 3 where transmission over a single subcarrier is illustrated.

Figure 3:
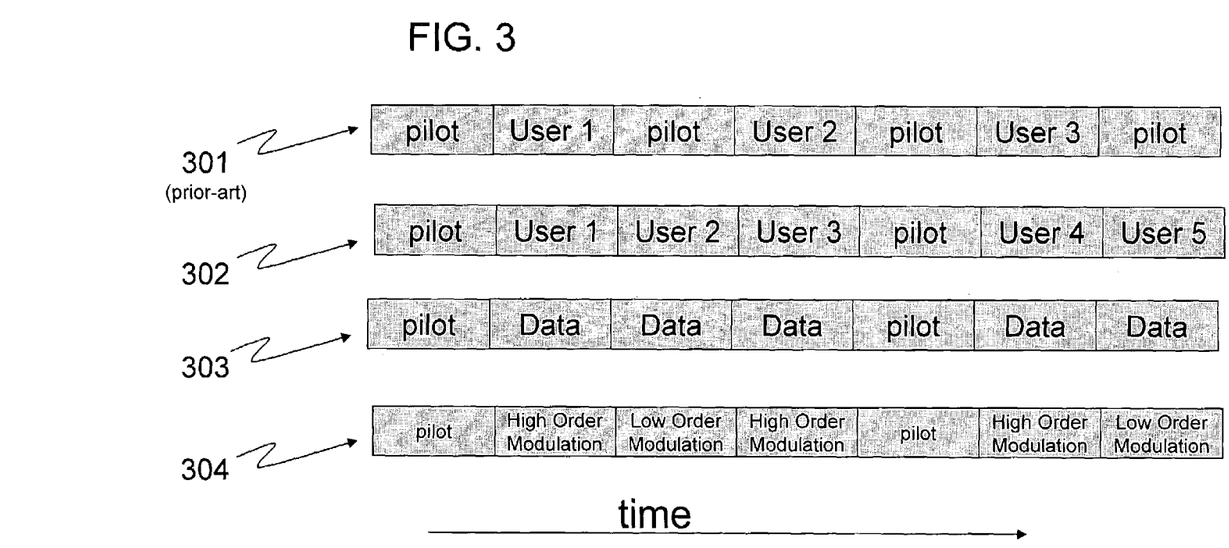
FIG. 3 illustrates prior-art transmission as compared to a transmission in accordance with the preferred embodiment of the present invention.

FIG. 3 illustrates prior-art transmission 301 as compared to a transmission in accordance with the preferred embodiment of the present invention. As one of ordinary skill in the art will recognize, prior-art transmission 301 typically comprises transmission of pilot data between user data. As discussed above, pilot overhead greatly reduces system throughput. In order to address this issue, in the preferred embodiment of the present invention actual user data is substituted for pilot data. More particularly, frame format controller 101 controls transmission such that low order modulated data is utilized for coherent demodulation in place of pilot data. This is illustrated in transmission scheme 302.

As is evident, transmission scheme 302 eliminates a portion of prior-art pilot transmission, and utilizes low-order modulated data in its place. Although in both the prior art and the preferred embodiment, the pilot transmissions are fixed throughout the frame, in the transmission structure of 302, user 2 data and user 5 data is substituted for pilot data, and is utilized for coherent demodulation of by other users (e.g., by user 1, user 3, and user 4). The present invention takes advantage of the fact that if higher order modulation is being utilized by a user, a lower order modulation would have much better than the desired target operating point and pre-decoding channel BER. Therefore, a user who is destined for higher order modulation can estimate lower order modulation users data without channel decoding, even if the data is not known. In order to enable the demodulation of higher order modulated data using lower order modulated data, the order of multiplexing of data streams onto a frame is based on the type of modulation to be used for transmission of the data streams. As shown in the transmission structure of 302, lower order modulated data (e.g., user 2 data and user 5 data) is placed proximal to higher order modulated data (e.g., user 1 data, user 3 data, and user 4 data). Depending on the channel quality of the users with data to be scheduled, lower order modulated data may be distributed in an alternating manner with higher order modulated data between pilot data. However, the order of multiplexing may also not be alternating (e.g., user 3 data is higher order modulated data, user 2 data is proximal lower order modulated data, and user 1 data, user 4 data, and user 5 data are lower order modulated data).

It should be noted that in the preferred embodiment of the present invention other user's lower order modulated data is utilized by an individual user, however, in alternate embodiments of the present invention this need not be the case. More particularly, in an alternate embodiment of the present invention, any lower order modulated data may be utilized by a receiver to coherently demodulate higher order modulated data. Thus as shown in transmission scheme 303, lower order modulated user data, which may be any user's data, is substituted for the prior-art pilot transmission. This is illustrated in transmission scheme 304, where in the preferred embodiment of the present invention lower order modulated data is placed proximal to higher order modulated data. Within transmission scheme 304, higher order modulated data is designated "high order modulation" and lower order modulated data is designated "low order modulation". In transmission scheme 304, lower order modulated data is distributed in an alternating manner with higher order modulated data between pilot data. However, the order of multiplexing may also not be alternating, as long as low order modulated data is placed proximal to higher order modulated data.

Figure 4:
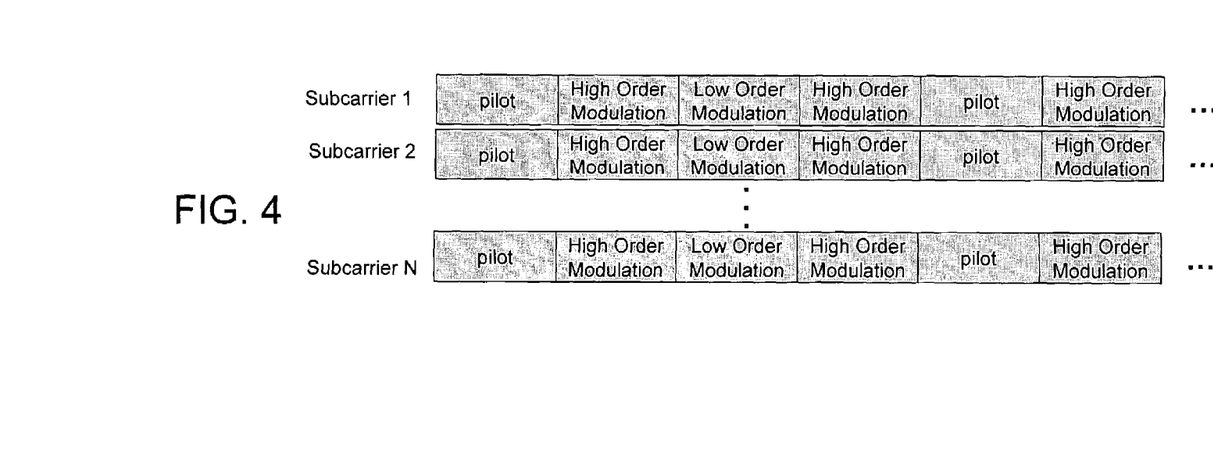
FIG. 4 is a further illustration of transmission in accordance with the preferred embodiment of the present invention.

FIG. 4 is a further illustration of transmission in accordance with the preferred embodiment of the present invention. In particular FIG. 4 illustrates the case where multiple sub-carriers are being transmitted. As is evident, each sub-carrier will have lower order modulated data placed proximal to higher order modulated data. In FIG. 4, lower order modulation is distributed in an alternating manner with higher order modulated data between pilot data on each subcarrier. However, the order of multiplexing may also not be alternating, as long as low order modulated data is placed proximal to higher order modulated data.

Figure 5:
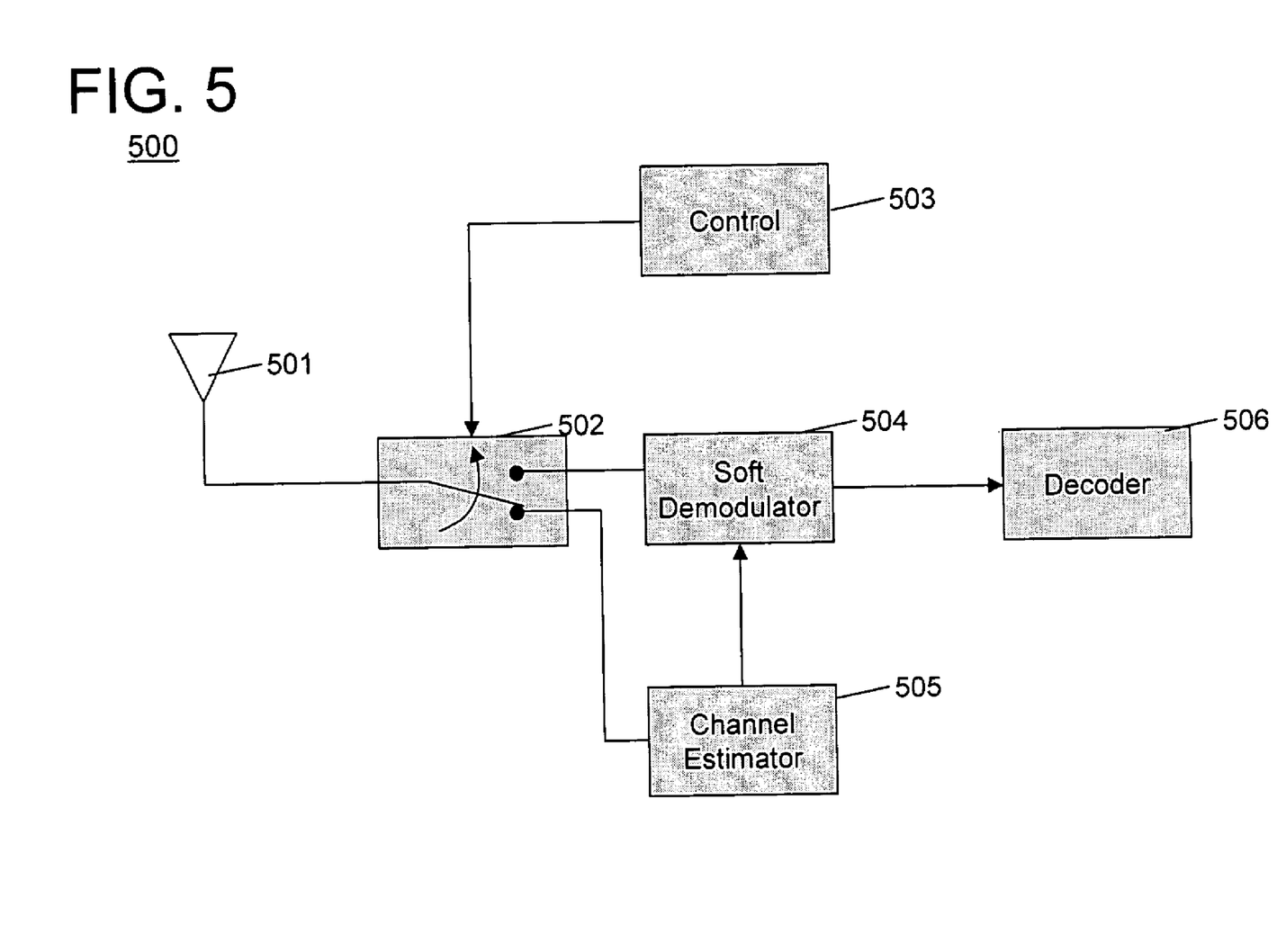
FIG. 5 is a block diagram of a receiver in accordance with the preferred embodiment of the present invention.

FIG. 5 is a block diagram of receiver 500 in accordance with the preferred embodiment of the present invention. As discussed above, receiver 500 utilizes pilot and lower order modulated data to perform channel estimation. During operation, receiver 500 receives pilots and data streams as illustrated in FIG. 3 and FIG. 4, via antenna 501. Controller 503 serves to operate switch 502 so that during pilot reception, and during the reception of lower order modulated data that will be used for channel estimation, the received signal passes to channel estimator 505. Channel estimator 505 serves to determine the complex gain (amplitude and phase) of the channel for all carriers and at all time locations that need to be decoded in order to aid in subsequent demodulation of a transmitted signal. When controller 503 senses that actual user data is being received for that user, controller 503 operates switch 502 such that the user data is passed to the soft demodulator 504 where it is demodulated utilizing channel estimates obtained by channel estimator 505. As known in the art, there are many ways that controller 503 can sense what type of data is being received. These include blind detection of the data type and explicit signaling of the data type. The explicit signaling of the data type may be in-band or out-of-band signaling, and is typically some form of control signaling. These methods are readily available to use for detecting the location of pilot data. Detecting lower order modulated data to be used for pilots is more difficult in the sense that the lower order modulated data may not be needed for channel estimation in any given transmission. Blind detection or explicit signaling may still be used, but the explicit signaling may involve the examination of control signaling originally intended for other users. As an alternative to blind detection or explicit signaling, the invention allows for implicit determination of data type. In this embodiment, controller 503 can make use of the knowledge that lower order modulated data is placed proximal to higher order modulated data. Therefore, when the user is receiving higher order modulated data, the user can assume that there is proximal lower order modulated data and act accordingly. For example, in transmission scheme 302, user 3 with higher order modulated data will know, via blind detection or explicit signaling, that there is pilot data following (to the right in transmission scheme 302) their data. Via implicit determination, user 3 also knows that there is lower order modulated data preceding (to the left in transmission scheme 302) their data. In the preferred embodiment, the soft demodulator 504 produces soft information (e.g., reliability values, log likelihood ratios, or the like with more than one bit per data value). In an alternate embodiment, the soft demodulator 504 produces only a single bit per data value. Once demodulated, the data is passed to decoder 506 for normal decoding. Note that in the alternate embodiment where the same user receives both high order modulated data and low order modulated data to be decoded, the low order modulated data is both passed to channel estimator 505 (to contribute to the channel estimates required by the higher order modulated data) and directly to soft demodulator 504 and decoder 506.

Figure 6:
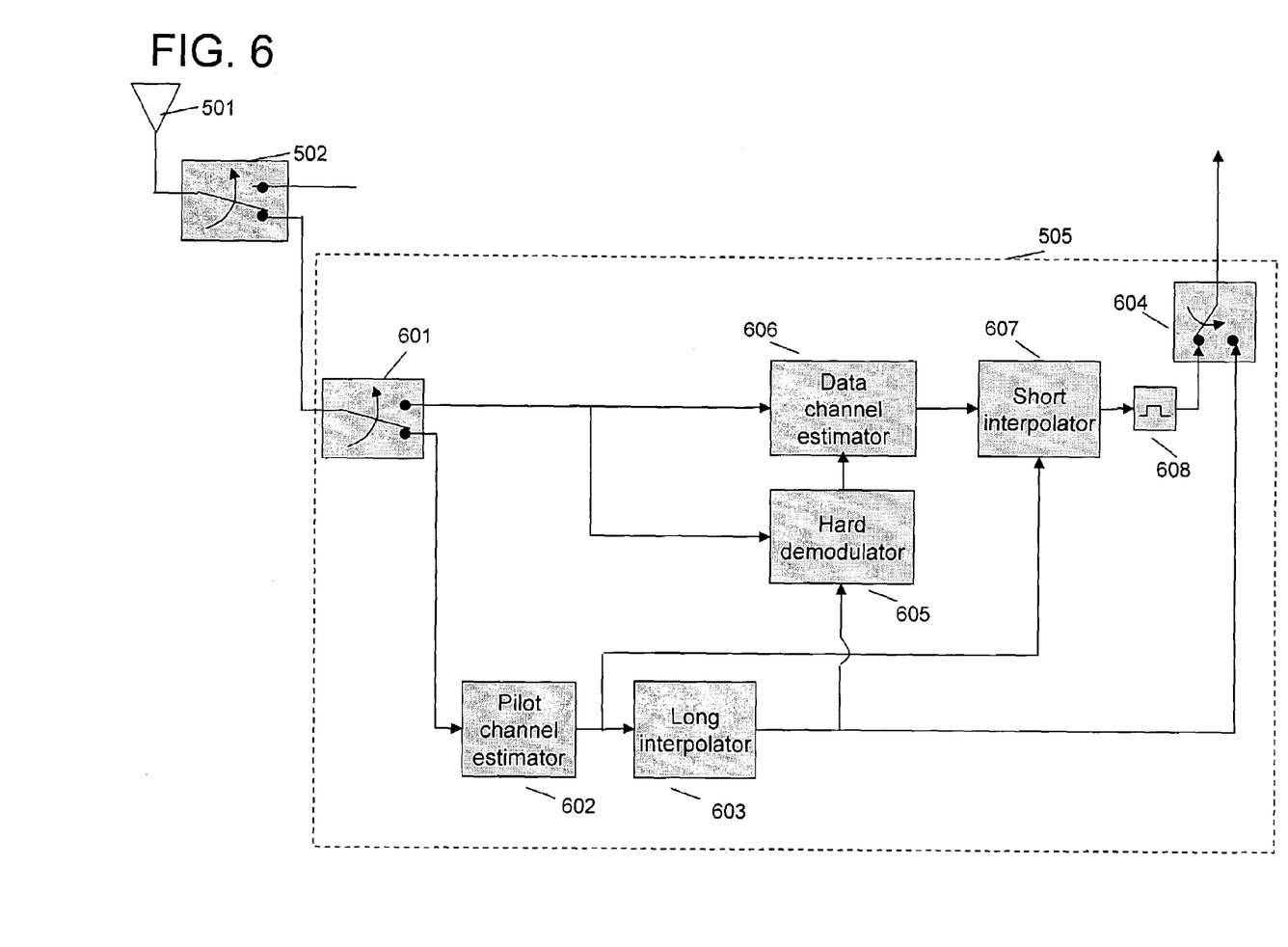
FIG. 6 is a block diagram of a channel estimator in accordance with the preferred embodiment of the present invention.

FIG. 6 is a block diagram of channel estimator 505 in accordance with the preferred embodiment of the present invention. Channel estimator 505 comprises components to perform two sets of channel estimates for all carriers and at all time locations. As discussed above, during operation of receiver 500 switch 502 serves to pass pilot data and low-order modulated data to channel estimator 505. Thus, the input to channel estimator 505 comprises either pilot data or lower order modulated data that will be used for channel estimation. During reception of pilot data, switch 601 passes the pilot data to pilot channel estimator 602 where standard channel estimation takes place. In particular, an estimate of channel (gain and phase) for each subcarrier is made at pilot locations using knowledge of transmitted pilot information. Then, the channel estimates can eventually be filtered over frequency for all sub carriers to remove noise. Note that a different filter can be applied based on high or low delay spread. In an alternate non-multi-carrier embodiment, the channel estimates are not filtered over frequency.

Finally, long interpolator 603 performs for each sub carrier, a linear interpolation between two estimates of the complex gain of the channel at two pilot locations. A first set of channel estimates in then available. If the user receives only low order modulated data, the switch 604 is set so that the first set of channel estimates is used by the soft demodulator 504.

During reception of lower order modulated data that will be used for channel estimation, switch 502 and switch 601 pass the data to the hard demodulator 605, which uses the first set of channel estimates provided by pilot channel estimator 602 and long interpolator 603 to make hard decisions on the received data. The hard estimate of the transmitted lower order modulated data is then used by the data channel estimator 606 to estimate the complex gain of the channel at the data locations. The short interpolator 607 interpolates between estimates of the channel at the pilot locations, provided by pilot channel estimator 602, and at the data locations, provided by the data channel estimator 606. Sliding filter 608 is applied in time to produce a second set of channel estimates for all carriers and all locations. Sliding filter 608 advantageously improves the quality of the second set of channel estimates. When the user receives higher order modulated data, the switch 604 is set so that the second set of channel estimates is used by the soft demodulator 504. Note that in an alternate embodiment the locations of sliding filter 608 and short interpolator 607 may be switched. In this embodiment, it is advantageous to have the pilot data and lower order modulated data to be equally spaced.

In the alternate embodiment where the same user receives both high order modulated data and low order modulated data to be decoded, the low order modulated data is both passed to channel estimator 505 (to contribute to the channel estimates required by the higher order modulated data) and directly to soft demodulator 504 and decoder 506. In this case, the soft demodulator 504 may use either the first set of channel estimates or the second set of channel estimates to demodulate the lower order modulated data. In some cases it may be advantageous (i.e., require less processing or memory for storage) for the soft demodulator 504 to use the second set of channel estimates for both higher order modulated data and lower order modulated data, when both types of data are to be decoded.

Figure 7:
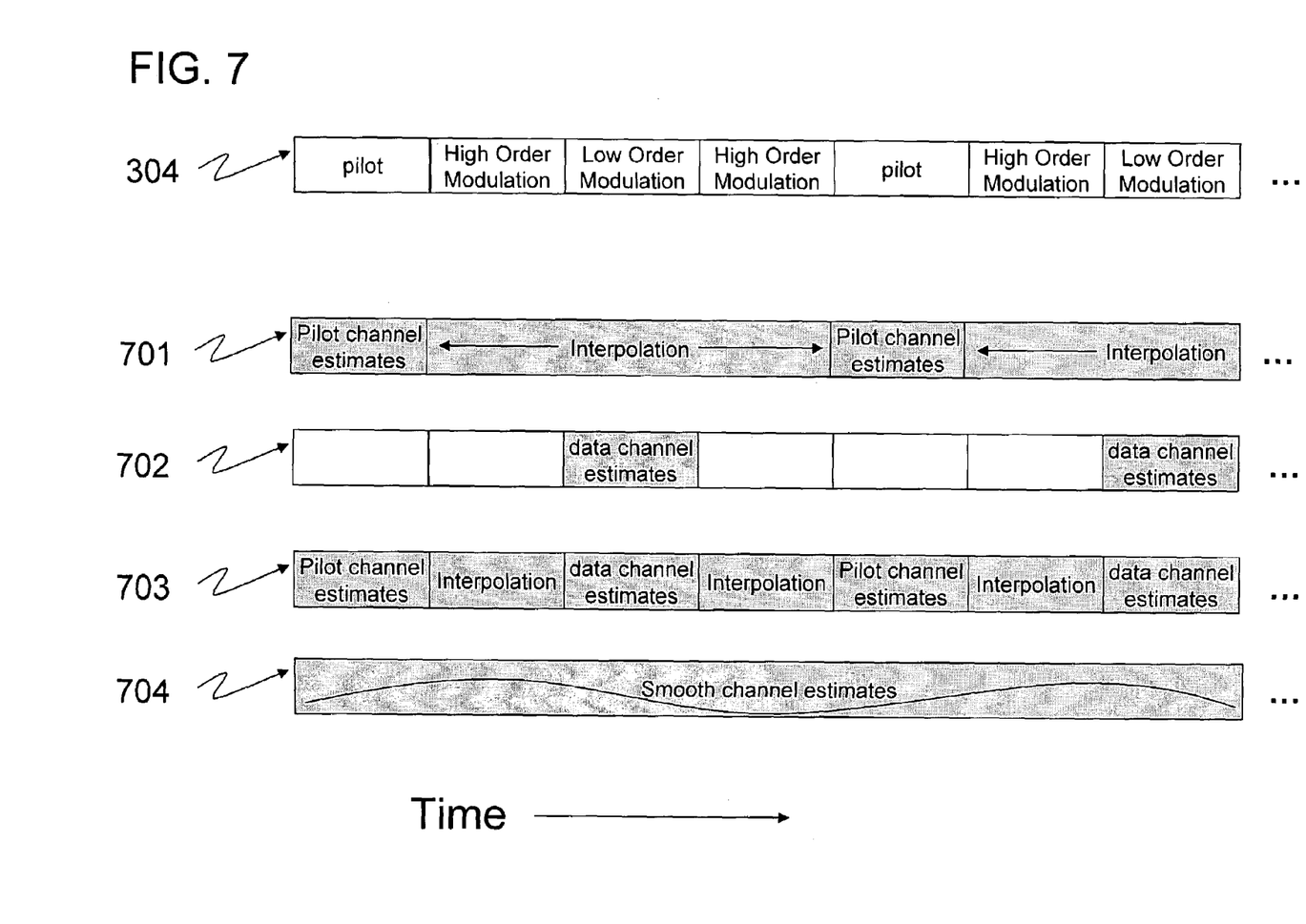
FIG. 7 is a flow chart showing operation of a transmitter in accordance with the preferred embodiment of the present invention.
Figure 8:
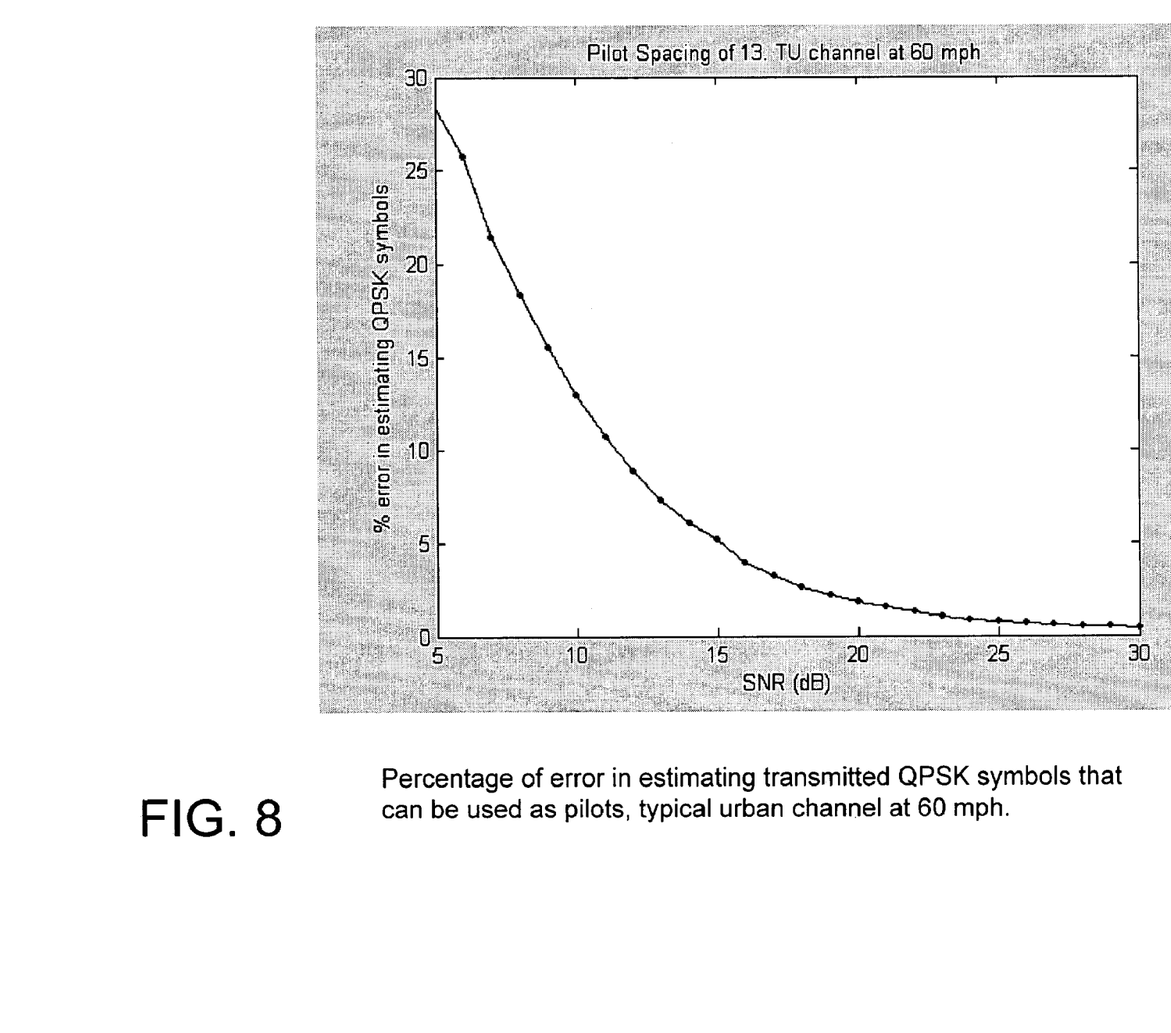
FIG. 8 shows the performance of blindly detecting QPSK symbols when pilot spacing is 13.
Figure 9:
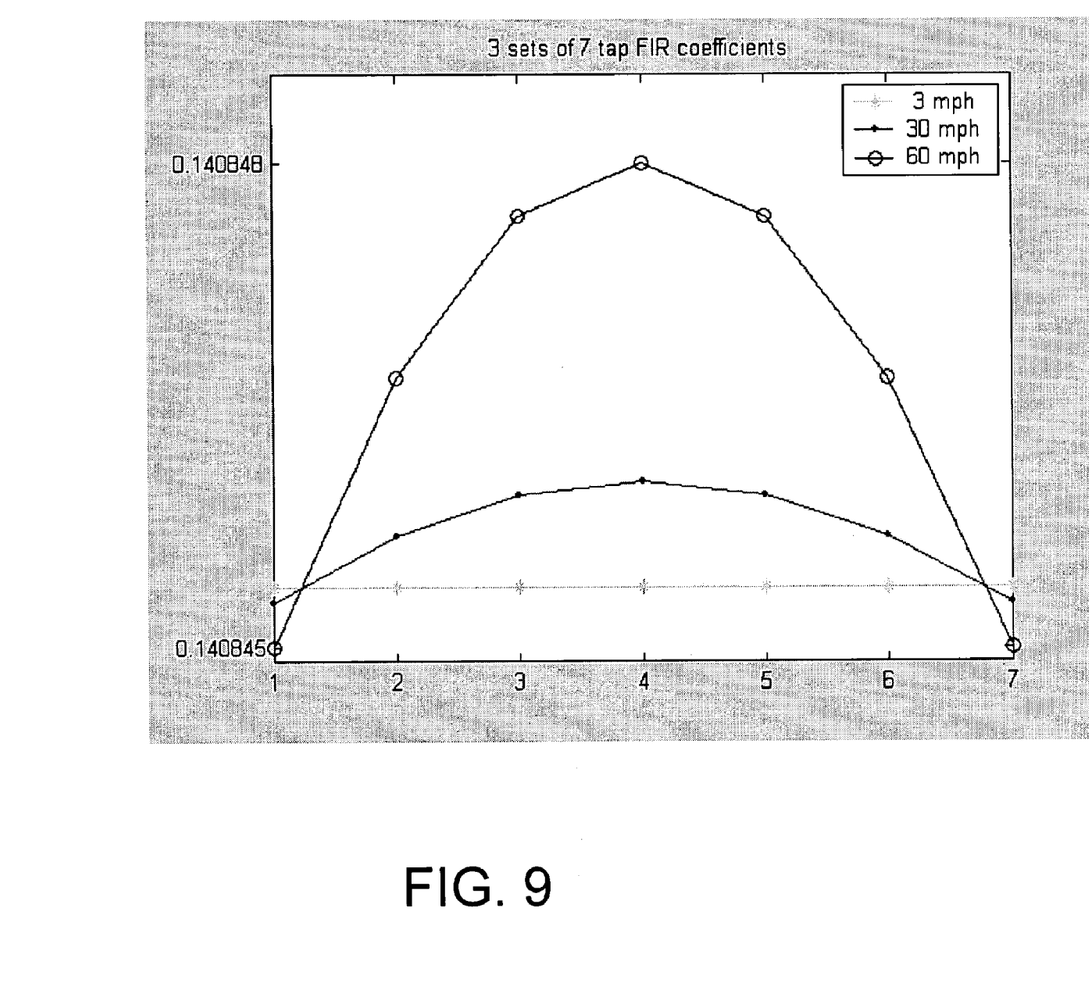
FIG. 9 illustrates various filtering techniques in accordance with the preferred embodiment of the present invention.

FIG. 7 shows several steps performed by the channel estimator 505 to provide estimates of the channel at all time locations. For simplicity, only a single carrier is shown. The transmission scheme 304, as described in FIG. 3, is shown in FIG. 7 to illustrate the type of data received by antenna 501 over the time locations in accordance with the preferred embodiment of the present invention. Time line 701 represents the first set of channel estimates obtained by the pilot channel estimator 602 and long interpolator 603. Time line 702 shows that the channel can be re-estimated by the data channel estimator 606 at the location of low order modulated data using the first set of channel estimates and the hard demodulator 605. Time line 703 shows the channel estimates at the output of the short interpolator 607. Time line 704 represents a second set of channel estimates that have been smoothed by sliding filter 608. Because lower order modulated data used by data channel estimator 606 is unknown, unlike pilot data, the detection of the data is not perfect. FIG. 8 shows the performance of blindly detecting QPSK symbols when pilot spacing is 13. Even though the method would typically be applied at higher signal quality levels (e.g., S/(I+N), C/I, or SNR)where higher order modulation would be selected, the error rate (e.g., about 5% at 15 dB SNR) is large enough to prevent adequate performance. However, the receiver can now apply in time the sliding filter 608 to advantageously improve the quality of the second set of channel estimates. It can be noted that a different filter can be used depending on high or low velocity (e.g., choice of three sets of coefficients for the 7 tap FIR filters is proposed in FIG. 9.) to improve the performance especially if the system is to be deployed for a wide range of user speed. It should also be noted that the taps of the sliding filter depend on the symbol spacing in time (the taps shown in FIG. 9 are based on a 50 microsecond symbol spacing). Note that in an alternate embodiment the locations of sliding filter 608 and short interpolator 607 may be switched. In this case time line 704 still contains smoothed channel estimates, but the smoothing occurs between the pilot channel estimates and data channel estimates in time line 703. The short interpolation is then the final step to producing the second set of channel estimates.

Figure 10:
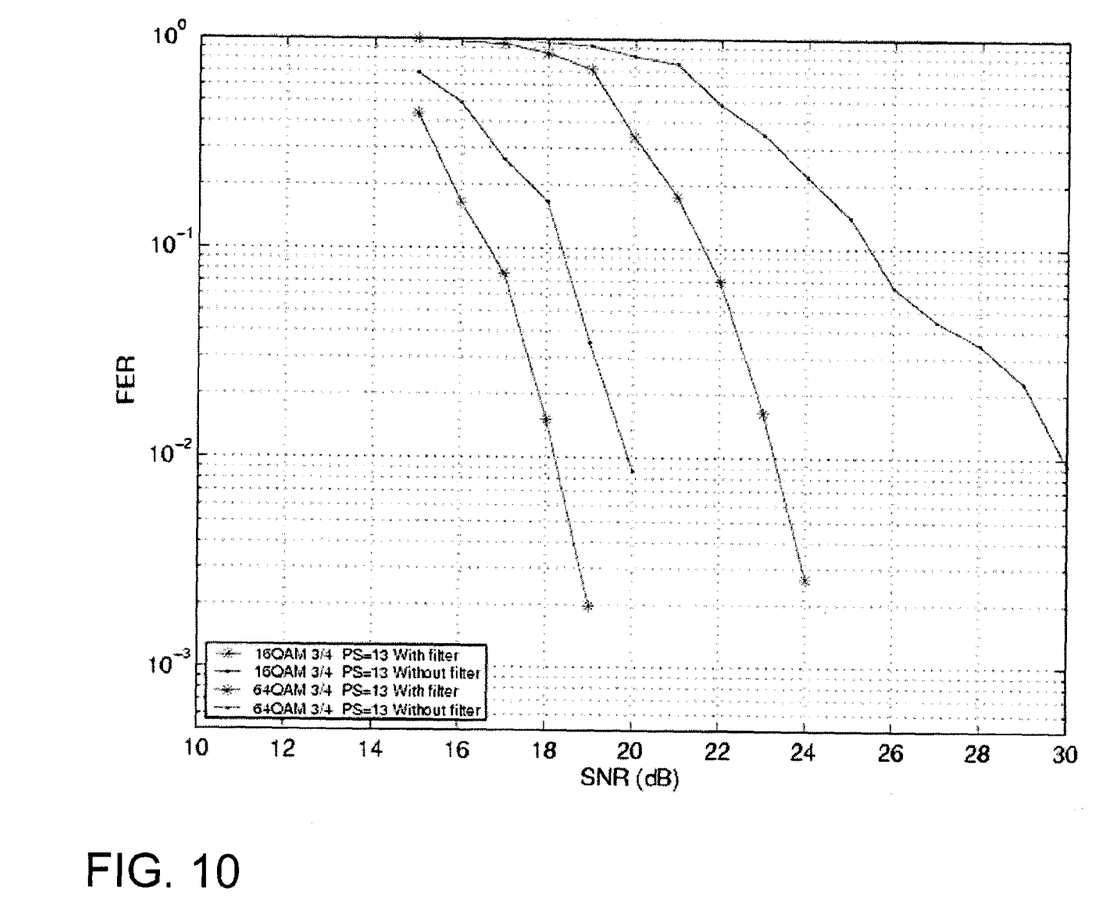
FIG. 10 illustrates the importance of the filtering applied in time.

FIG. 10 shows the importance of the filtering applied in time. Removing this filter can degrade the performance by several dB and create error floor.

Figure 11:
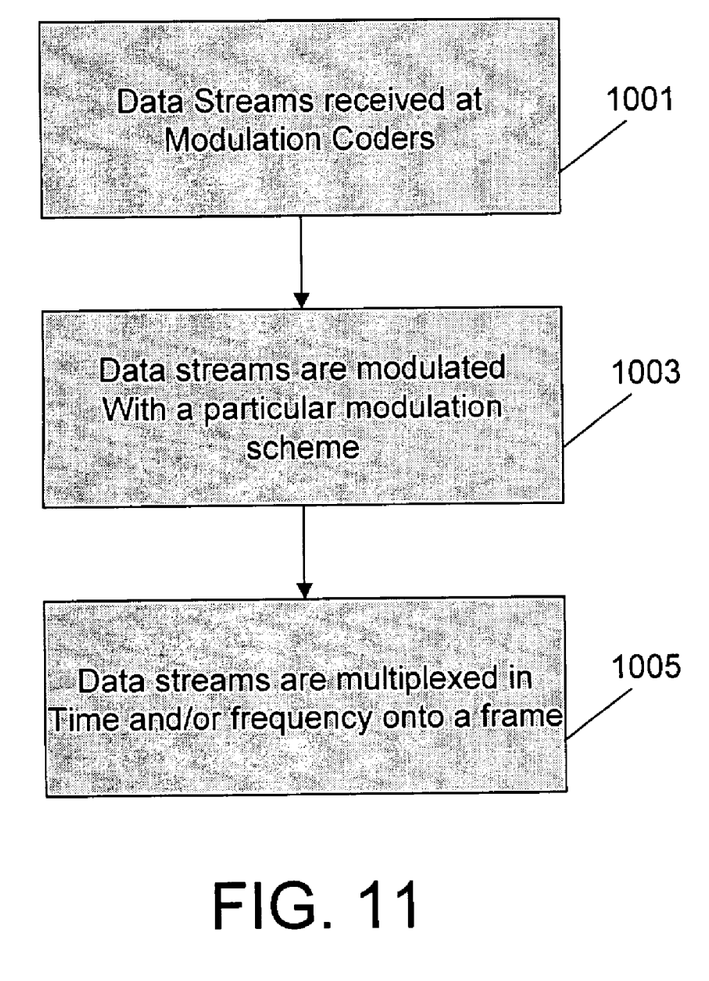
FIG. 11 is a flow chart showing operation of a transmitter in accordance with the preferred embodiment of the present invention.

FIG. 11 is a flow chart showing operation of a transmitter in accordance with the preferred embodiment of the present invention. The logic flow begins at step 1001 where data streams are received at several modulation coders 103–105. At step 1003, each data stream is modulated with a particular modulation scheme. Finally at step 1005, frame format controller 101 serves to multiplex the streams in time onto a frame for transmission. As discussed above, in the preferred embodiment of the present invention frame format controller 101 receives information from controllers 103–105 and adjusts each subcarrier so that lower order modulated data is placed proximal to higher order modulated data.

Figure 12:
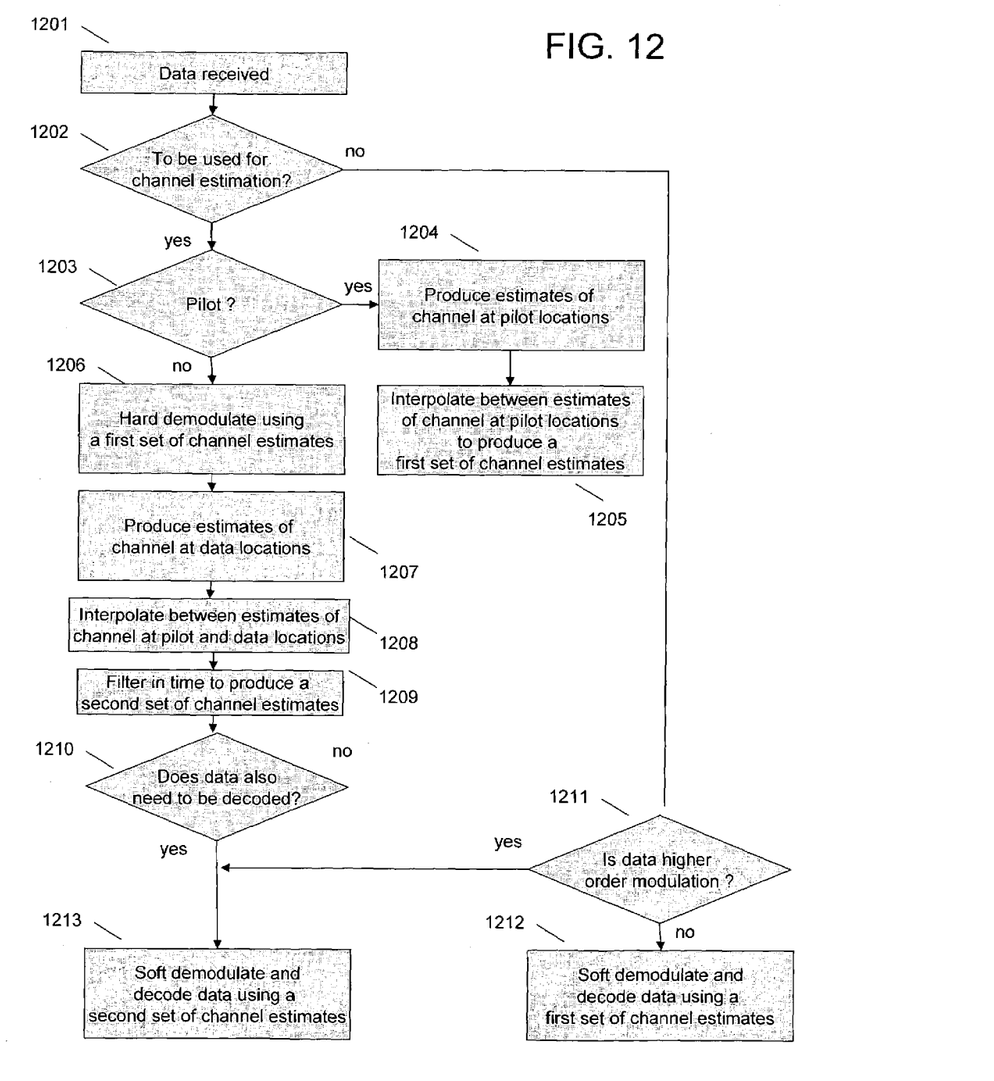
FIG. 12 is a flow chart showing operation of the receiver of FIG. 5 in accordance with the preferred embodiment of the present invention.

FIG. 12 is a flow chart showing operation of receiver 500 in accordance with the preferred embodiment of the present invention. The logic flow begins at step 1201 where data is received at switch 502. At step 1202 it is determined if the data is to be demodulated or utilized for channel estimation. In this case, steps 1203 to 1209 will be used to construct the first or second sets of channel estimates. If at step 1202 it is determined that the data is to be demodulated, then the logic flow continues to step 1211. If the data, not used for channel estimation, is higher order modulation, the data is demodulated at step 1213 using the second set of channel estimates. If the data is lower order modulated data and not used for channel estimation, then it can be demodulated at step 1212 using a first set of channel estimates based on pilot only.

If at step 1202 it is determined that the data is to be utilized for channel estimation, then the logic flow continues to step 1203 where it is determined if the data is pilot or lower order modulated data. If, at step 1203 it is determined that the data is pilot, the data is sent to pilot channel estimator 602 where standard pilot channel estimation takes place at step 1204. Step 1205 follows where interpolation between estimates of channel at pilots locations takes place to produce a first set of channel estimates at all locations. However, if at step 1203 it is determined that the data is not pilot—but low order modulated data—, the logic flow continues to step 1206 where the transmitted data is estimated by hard demodulator 605 using a first set of channel estimates. The estimated transmitted data is used in step 1207 to estimate the channel at the data location by the data channel estimator 606. Short interpolator 607 performs in step 1208 linear interpolation between channel estimates at lower order modulated data location and pilot locations. Sliding filter 608 is applied in time in step 1209 to smooth the channel estimation at all location that produce a second set of channel estimates. Note that in an alternate embodiment the steps 1208 and 1209 may be switched. In this case the smoothing occurs between the pilot channel estimates and data channel estimates in step 1209 before the interpolation step 1208.

In the alternate embodiment, one user can be assigned both lower order modulated data and higher order modulated data for decoding. This could occur , for example, if there is only one user that needs to receive data. In step 1210, it is determined if the lower order modulated data, used by the data channel estimator, needs to be also decoded for the user. If it is determined that the data needs to be also decoded, then the flow continue in step 1213 where the data is soft demodulated by 504 using a second set of channel estimates.

While the invention has been particularly shown and described with reference to a particular embodiment, it will be understood by those skilled in the art that various changes in form and details may be made therein without departing from the spirit and scope of the invention. For example, in an alternate embodiment the multiplexing of higher order modulated data, lower order modulated data, and pilot data may not be the same on each subcarrier, as was shown in FIG. 4. For example, higher order modulated data can be interlaced in frequency with a lower order modulation. In low to medium delay spread environment, channel gain on adjacent carriers are highly correlated. Pilot can then be sent only on a subset of the carriers to decode the lower order modulated data. The lower order modulation and pilots can be used to demodulate the higher order modulation, in accordance with the present invention. It is intended that such changes come within the scope of the following claims.

The invention claimed is:

1. A method for data transmission, the method comprising the steps of:

determining a modulation coding for a plurality of data streams, wherein each of the plurality of data streams utilizes one of several available modulation and coding schemes; and multiplexing the plurality of data streams onto a frame, wherein the order of multiplexing the plurality of data streams is based on a type of modulation utilized for transmission for the plurality of data streams, wherein the step of multiplexing comprises the step of placing lower order modulated data proximal to higher order modulated data so that the lower order modulated data can be utilized for coherent demodulation.

2. The method of claim 1 wherein the step of multiplexing comprises the step of substituting lower order modulated data for pilot data.

3. The method of claim 1 wherein the step of multiplexing comprises the step of placing QPSK or BPSK modulated data proximal to higher order modulated data.

4. The method of claim 1 wherein the step of multiplexing comprises the step of placing QPSK or BPSK modulated data proximal to 16 QAM, 64 QAM, or 256 QAM modulated data.

5. A method for data reception, the method comprising the steps of:
   receiving a frame of data having lower order modulated data multiplexed proximal to higher order modulated data and a pilot data;
   utilizing the pilot data for providing channel estimation to aid in subsequent demodulation of a transmitted signal; and
   utilizing lower order modulated data to provide channel estimation to aid in subsequent demodulation of the transmitted signal.

6. The method of claim 5 further comprising the step of producing a first set of channel estimates from the pilot data.

7. The method of claim 6 further comprising the step of producing a second set of channel estimates from the lower order modulated data and the first set of channel estimates.

8. The method of claim 7 wherein the step of producing the second set of channel estimates comprises the steps of:
   interpolating between the first set of channel estimates and estimates of the channel at lower order modulated data locations; and
   filtering the interpolation.

9. The method of claim 5 wherein the step of utilizing lower order modulated data comprises the step of utilizing QPSK or BPSK modulated data.

10. An apparatus comprising:
    a plurality of modulators outputting a plurality of data streams;
    a switch coupled to the plurality of modulators; and
    a transmission format controller coupled to the switch and instructing the switch to multiplex the plurality of data streams onto a frame, wherein the order of multiplexing the plurality of data streams is based on a type of modulation utilized for transmission for the plurality of data streams, wherein the transmission format controller instructs the switch to substitute lower order modulated data for pilot data.

11. The apparatus of claim 10 wherein the transmission format controller instructs the switch to place lower order modulated data proximal to higher order modulated data.

12. The apparatus of claim 11 wherein QPSK or BPSK modulated data is placed proximal to 16 QAM, 64 QAM, or 256 QAM modulated data.

13. An apparatus comprising:
    a receiver for receiving a frame of data having lower order modulated data multiplexed proximal to higher order modulated data and a pilot data;
    a pilot channel estimator for utilizing the pilot data for providing channel estimation to aid in subsequent demodulation of a transmitted signal; and
    a data channel estimator for utilizing lower order modulated data providing channel estimation to aid in subsequent demodulation of the transmitted signal.

14. The apparatus of claim 13 wherein the pilot channel estimator produces a first set of channel estimates from the pilot data.

15. The apparatus of claim 14 where in the data channel estimator produces a second set of channel estimates from the lower order modulated data and the first set of channel estimates.

16. The apparatus of claim 15 wherein the second set of channel estimates are obtained by interpolating between the first set of channel estimates and estimates of the channel at lower order modulated data locations, and filtering the interpolation.

17. The apparatus of claim 13 wherein the lower order modulated data comprises QPSK or BPSK modulated data.

* * * * *